US008072444B2

(12) United States Patent
Ikeda et al.

(10) Patent No.: US 8,072,444 B2
(45) Date of Patent: Dec. 6, 2011

(54) DISPLAY DEVICE AND ELECTRONIC APPARATUS USING THE SAME

(75) Inventors: Naoyasu Ikeda, Tokyo (JP); Hiroshi Haga, Tokyo (JP); Tomohiko Otose, Tokyo (JP); Tatsuya Uchikawa, Tokyo (JP); Daisuke Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 1584 days.

(21) Appl. No.: 11/180,103

(22) Filed: Jul. 13, 2005

(65) Prior Publication Data

US 2006/0012543 A1 Jan. 19, 2006

(30) Foreign Application Priority Data

Jul. 13, 2004 (JP) ................................ 2004-206212

(51) Int. Cl.
*G06F 3/038* (2006.01)

(52) U.S. Cl. ......................... 345/204; 345/102; 349/143

(58) Field of Classification Search .................... 345/36, 345/87, 76, 82–83, 102, 204; 315/169.3; 349/116, 143; 362/97.2, 97.3, 600; 257/291, 257/292

See application file for complete search history.

(56) References Cited

U.S. PATENT DOCUMENTS

| | | | | |
|---|---|---|---|---|
| 6,717,560 | B2 * | 4/2004 | Cok et al. | 345/82 |
| 6,961,038 | B2 * | 11/2005 | Yoshinaga et al. | 345/88 |
| 7,592,980 | B2 * | 9/2009 | Yamazaki et al. | 345/76 |
| 2002/0017962 | A1 | 2/2002 | Takagi | |
| 2004/0012556 | A1 | 1/2004 | Yong et al. | |
| 2006/0007097 | A1 | 1/2006 | Ichikawa | |

FOREIGN PATENT DOCUMENTS

| | | | |
|---|---|---|---|
| CN | 1327223 | A | 12/2001 |
| CN | 1774665 | A | 5/2006 |
| JP | A-61-259287 | | 11/1986 |
| JP | A-64-006927 | | 1/1989 |
| JP | A-02-309316 | | 12/1990 |
| JP | A-03-249622 | | 11/1991 |
| JP | A-04-352128 | | 12/1992 |
| JP | A-06-11690 | | 1/1994 |
| JP | H6-332385 | A | 12/1994 |
| JP | 2000-122575 | A | 4/2000 |
| JP | 2002-175026 | A | 6/2002 |

OTHER PUBLICATIONS

JP Official Action dated Jan. 26, 2010 together with partial translation.

* cited by examiner

*Primary Examiner* — Abbas Abdulselam

(74) *Attorney, Agent, or Firm* — Scully, Scott, Murphy & Presser PC

(57) ABSTRACT

A light-detecting element, an analog-to-digital converter circuit, and a parallel-serial converter circuit are mounted on a substrate, using a thin film transistor, of an active matrix-type display device, and when a circuit is selected by an external chip-select signal, the luminance is adjusted by transmitting a signal of the light-detecting element, converted into digital data, to a luminance control circuit in sync with a clock signal.

20 Claims, 10 Drawing Sheets

DISPLAY DEVICE AND ELECTRONIC APPARATUS USING THE SAME

FIELD OF THE INVENTION

The present invention relates to a display device and especially to a display device that can adjust the luminance according to the ambient illuminance.

BACKGROUND OF THE INVENTION

Recently, Liquid Crystal Display (LCD hereinafter) that has the characteristics of being thin and high definition, and Electro Luminescent Display (ELD hereinafter) that uses organic electro-luminescence element have been widely used. The former, the LCD generally has a lighting device called backlight or frontlight, and displays a picture by transmitting or reflecting the light from these light. In order to keep the display screen of such a device easy to see or power consumption low, the idea of automatically adjusting the light quantity of backlight and frontlight according to the ambient brightness has been suggested.

FIG. 9 is a block diagram showing the function structure of an LCD described in Patent Document 1. In FIG. 9, 100 is an optical sensor that detects the external brightness of the device, 101 is a backlight, the light source of the device, 102 is a luminance adjusting unit that adjusts the luminance of the backlight, 103 is a memory that stores the data used for adjusting the luminance, and 104 is a processing unit that transmits a signal used for adjusting the luminance to the luminance adjusting unit 102, based on the signal from the optical sensor 100 and the data of the memory 103. This LCD stores the information of the backlight luminance that corresponds to the preset quantity of light received by the device in the memory 103, lets the processing unit 104 calculate a luminance value of the backlight 101 that corresponds to the quantity of light received by the optical sensor 100 based on the data in the memory 103, and lets the luminance adjusting unit 102 automatically adjust the luminance of the backlight 101 based on the result of the calculation by the processing unit 104. The same kinds of technologies are described in Patent Documents 2 and 3. What is common among these devices is the fact that they all require a separate optical sensor near the display device. Because of this, the device tends to be large, there are restrictions as to where the optical sensor should be placed, and accurate light control cannot be achieved since the brightness is not measured directly at the display section.

FIG. 10 is a drawing showing the structure of an LCD described in Patent Document 4. In FIG. 10, 110 is a liquid crystal display panel, 111 is an optical sensor formed on the substrate whereon a thin film transistor (TFT hereinafter) of the liquid crystal display panel is formed, 112 is a backlight, the light source of the liquid crystal display panel, 113 is a control circuit that controls the luminance of the backlight 112 according to a signal from the optical sensor 111. In this method, the optical sensor 111 is formed on the substrate that comprises the liquid crystal display panel 110. Therefore, it is not necessary to provide a separate optical sensor externally, and the problems mentioned above such as the increase in size and the layout restrictions stemming from the shape of the device do not occur. Further, since the optical sensor can be placed very close to the display section, the brightness of the display section can be measured accurately. Patent Documents 5 and 6 describe the same kind of technologies.

[Patent Document 1]
Japanese Patent Kokai Publication No. JP-A-04-352128
[Patent Document 2]
Japanese Patent Kokai Publication No. JP-A-61-259287
[Patent Document 3]
Japanese Patent Kokai Publication No. JP-A-02-309316
[Patent Document 4]
Japanese Patent Kokai Publication No. JP-A-06-11690
[Patent Document 5]
Japanese Patent Kokai Publication No. JP-A-64-006927
[Patent Document 6]
Japanese Patent Kokai Publication No. JP-A-03-249622

SUMMARY OF THE DISCLOSURE

However, even with the technologies described in the above-mentioned Patent Document, the following problems still remain. For instance, the LCDs described in Patent Documents 4 to 6 has a sensor that detects external light, or an optical sensor that detects the luminance of the backlight side, on a glass substrate. Here, let's consider the case where the output of this optical sensor is outputted to a control circuit as a current. In general, output current of optical sensor is very small. The control circuit is provided to the outside of the glass substrate. Therefore, the optical sensor and control circuit, provided inside and outside of the glass substrate respectively, need to be connected electrically by a wiring line such as a flexible cable, and the length of this wiring line needs to be at least several centimeter. The very small detecting current from the optical sensor flows in the wiring line and if external noise enters the cable, the luminance control will not be able to be performed accurately because the photodetecting current will not be transferred to the control circuit accurately. The same problem occurs in the case where the output of the optical sensor is outputted as a voltage.

Meanwhile, as mobile electronic devices such as mobile phones, PDAs (Personal Digital Assistant), and game devices are becoming more functional, the demand for long continuous use time is increasing. Concerning the effort to improve the energy-saving abilities of these devices, the power consumption of the backlight and frontlight of an LCD is a big part of the problem. This applies not only to LCDs, but also ELDs, self-luminous devices. Furthermore, since these mobile electronic devices are to be carried around and used outdoor, they need to be small, light and reliable against external shock when being carried around. However, as explained above, while the energy-saving issue has been dealt with by some of the conventional technologies, the problems such as the increases in size and weight of the device, and the decrease in reliability as a mobile device, due to the fact that more connection lines are needed between the display device and outside, remain unsolved.

In view of the above problems there is much desired in the art for improvement. It is an object of the present invention to provide a small, light-weighted, and reliable display device that can automatically adjust the luminance without being influenced by external noise. Another object of the present invention is to provide a display device that can adjust the luminance by itself without having an external luminance adjusting circuit.

According to a first aspect of the present invention there is provided a display device, with a substrate on which a pixel switching element is disposed, wherein a light-detecting element and data transmission circuit that converts a signal outputted from the light-detecting element into serial digital data and outputs the result are disposed on the substrate, and the luminance is adjusted according to an external chip-select signal. This display device has the characteristic of being resistant to noise since it converts the signal into serial digital data on the substrate.

Furthermore, according to a second aspect of the present invention, there is provided a display device, with a substrate on which a pixel switching element is disposed, wherein a light-detecting element and a luminance control circuit are disposed on the substrate. Based on a signal outputted from the light-detecting element, the luminance control circuit drives the light source of the display device disposed in the front or back of the substrate, and adjusts the luminance. Since this display device completes the luminance control on the substrate, it, too, has the characteristic of being resistant to noise.

The meritorious effects of the present invention are summarized as follows.

According to the present invention, in a display device wherein a light-detecting element is provided and a light control operation is performed according to external light, a structure where the influence of noise can be minimized and it is not necessary to provide a new circuit outside of a substrate can be obtained. This can be achieved by employing the structure where the output of an optical sensor is converted into digital data, which is resistant to noise, before being transmitted to an existing luminance control circuit, or the structure where the luminance control is completed on the substrate.

PREFERRED EMBODIMENTS OF THE INVENTION

Embodiment 1

Next, a first preferred embodiment in which the present invention is applied to a transmission-type LCD with a backlight using an LED (Light Emitting Diode) will be described. The display device 1 relating to the present embodiment comprises an optical sensor 6, analog-to-digital converter circuit (ADC hereinafter) 7, and a serial-parallel converter circuit 8 provided on a substrate 4 on which a TFT driving pixels is provided, converts an output signal of the sensor 6 into a digital signal, and enables the digital signal converted into serial data to be transmitted to use it for the luminance control of the display device, corresponding to external chip-select signals.

Figure 1:
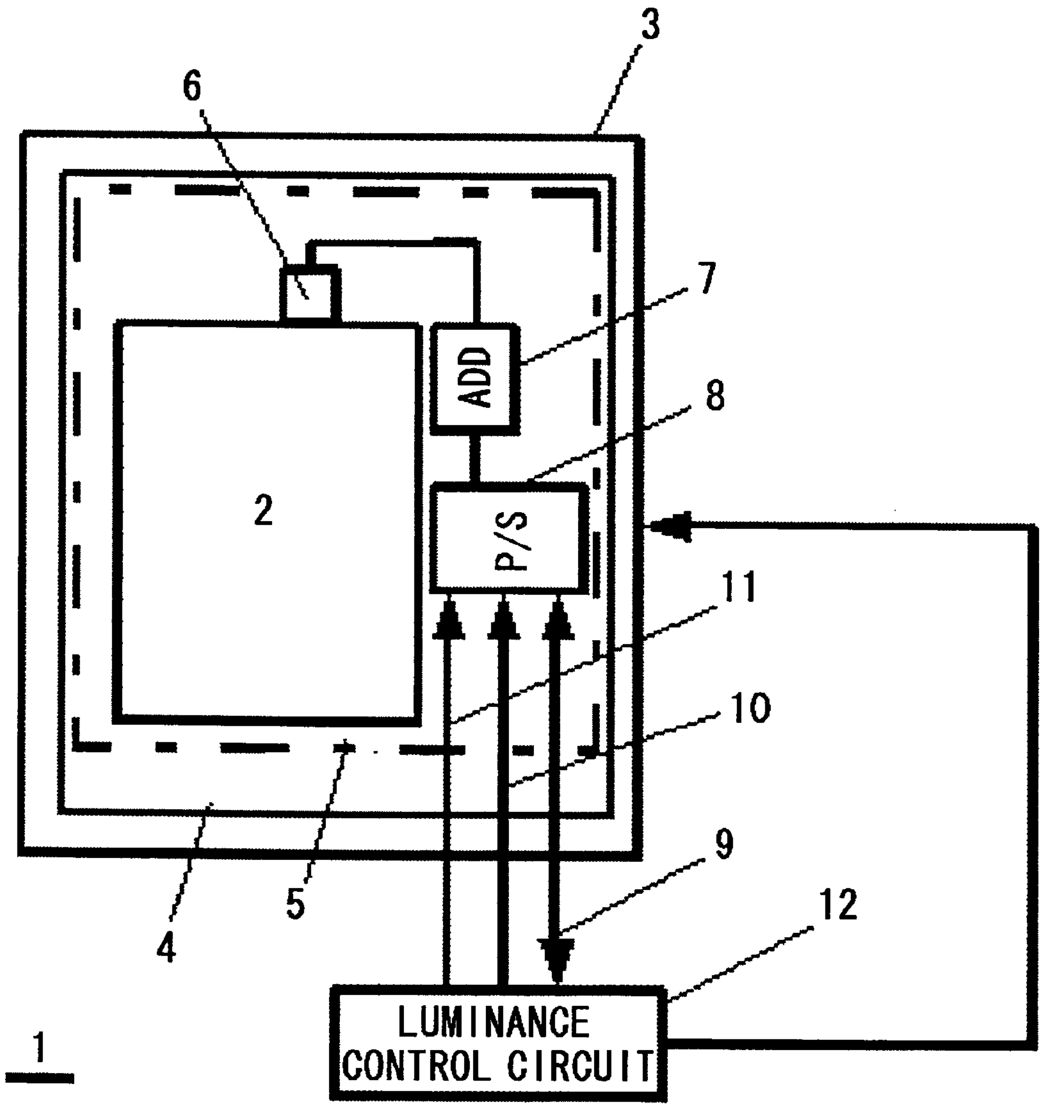
FIG. 1 is an outline drawing of a display device relating to a first embodiment of the present invention.

FIG. 1 is an outline drawing of the display device relating to the first embodiment of the present invention. In reference to FIG. 1, the display device 1 comprises a backlight 3, which is the light source, the TFT substrate 4, on which the pixels (electrodes) and the TFT driving liquid crystal are provided, a counter substrate 5 disposed so that a liquid crystal layer, not shown in the drawing, is interposed between the TFT substrate 4 and the counter substrate 5, and a luminance control circuit 12 outside of the substrates, and a display region 2 is provided.

On the TFT substrate 4, the optical sensor 6 using a photodiode is formed using the means described in Japanese Patent Kokai Publication No. JP-A-06-11690 or the like. Similarly, the ADC 7 that converts an analog signal outputted from the optical sensor 6 into a digital signal, and the parallel-serial converter circuit (P/S hereinafter) 8 that parallel-serial converts the digital data from the ADC7 into serial data are formed on the TFT substrate 4. Here, the optical sensor 6 is provided near the display region 2. ADC 7 and P/S 8 are constituted to include the TFT formed on the glass substrate that comprises the TFT substrate 4, and each of them is wired and provided near the optical sensor 6.

Between the P/S 8 and the luminance control circuit 12, a serial bus 9 for transmitting the signal from the P/S 8, a transmission path for a chip-select signal (CS hereinafter) 10 that activates the serial bus 9, and a transmission path for a timing clock (CLK hereinafter) 11 that becomes the reference when the serial bus 9, activated by the CS 10, outputs a signal are provided. Further, the luminance control circuit 12 can control the current flowing in the backlight 3, and it controls the luminance of the backlight 3 based on the serial data from the P/S 8.

Figure 2:
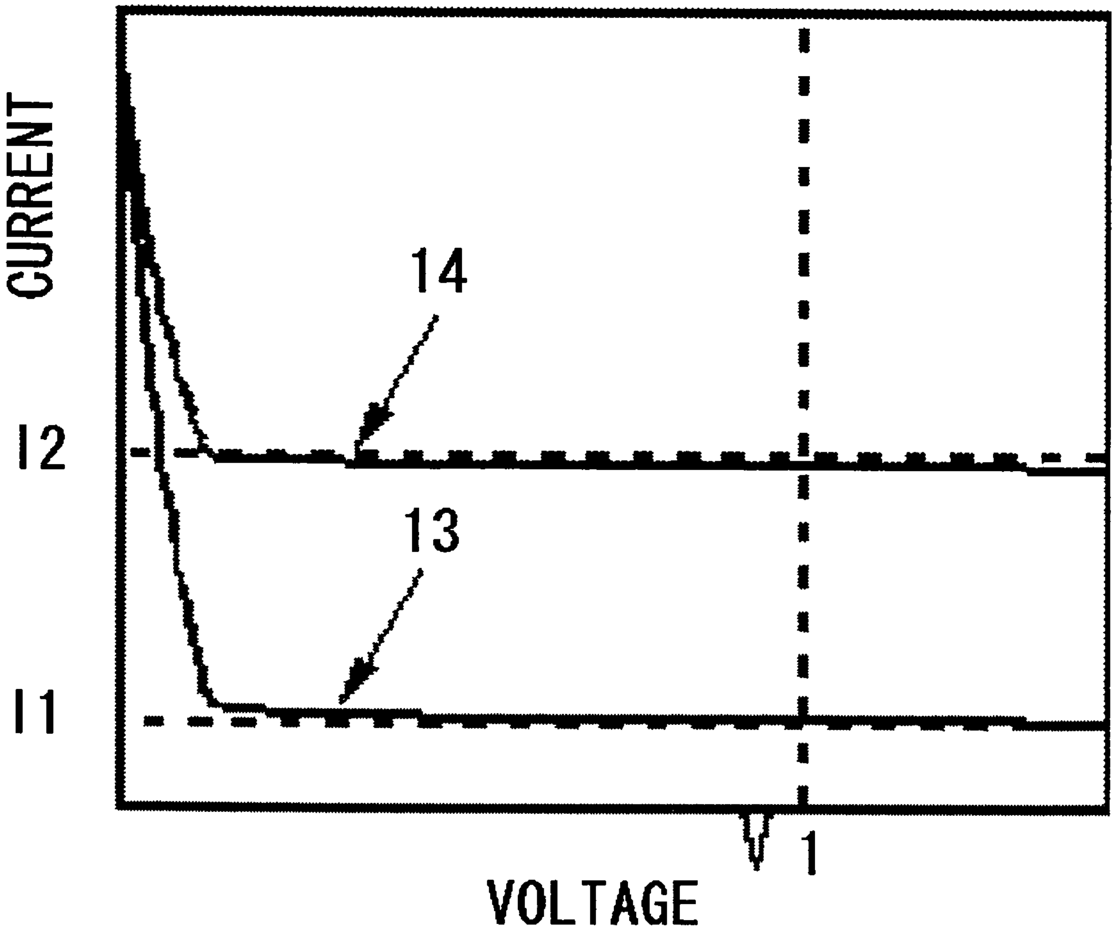
FIG. 2 is a drawing showing the voltage-current characteristics of a photodiode.

Next, the operation of the present embodiment will be described. FIG. 2 is a drawing showing the voltage-current characteristics of the photodiode of the optical sensor 6 provided on the TFT substrate 4. FIG. 2 also shows a voltage-current characteristic curve 13 indicating the voltage-current characteristics of the photodiode when the illuminance by external light is low, and a voltage-current characteristic curve 14 indicating the voltage-current characteristics of the photodiode when the illuminance by external light is high. As is clear by comparing the voltage-current characteristic curves 13 and 14, when the illuminance is low, the current is low, and the higher the illuminance becomes, the more the current increases. In the following explanations, we will assume that a voltage V1, shown in FIG. 2, is applied to the photodiode.

First, an explanation on the case where the illuminance around the display region 2 is low will be given. In this case, a low current value I1 flows in the optical sensor 6, provided near the display region 2. This current value I1 is converted into a digital signal by the ADC 7, and into serial digital data by the P/S 8. Meanwhile, when the CS 10 is supplied to the P/S 8, the serial bus 9 connected to the P/S 8 becomes active, and this digital data is transmitted to the luminance control circuit 12 via the serial bus 9 in sync with the CLK 11. The luminance control circuit 12, which has received the digital data, detects that the illuminance of external light is low from the value of the data. In this case, the luminance control circuit 12 controls so that a current corresponding to a low luminance flows in the LED of the backlight 3 since the display can be recognized even with a low backlight luminance.

Next, an explanation on the case where the illuminance around the display region 2 is high will be given. In this case, a high current I2 flows in the optical sensor 6, provided near the display region 2. As in the example above, the current value I2 is converted into a digital signal by the ADC 7, and into serial digital data by the P/S 8. Meanwhile, when the CS 10 is supplied to the P/S 8, the serial bus 9 connected to the P/S 8 becomes active, and this digital data is transmitted to the luminance control circuit 12 via the serial bus 9 in sync with the CLK 11. This time, the luminance control circuit 12, which has received the digital data, detects that the illuminance of external light is high from the value of the data. In this case, the luminance control circuit 12 controls so that a current corresponding to a high luminance flows in the LED of the backlight 3, increasing the luminance of the backlight 3 so that the display is easy to see.

The above-described control is performed continuously while the CS 10 is being supplied to the P/S 8. Therefore, it becomes possible to automatically increase the luminance in a bright area in order to enhance the visibility of the display or to automatically decrease the luminance in a dark area, according to the variation of the external light illuminance.

Needles to say, in the case where the illuminance detection and automatic light control are not being performed, the CS 10 is not supplied, deactivating the serial bus 9, and the serial bus 9 is detached from the P/S 8.

The structure described above enables the small signal flowing in the photodiode to be converted into a digital signal, which has a stronger immunity against noise, by the ADC 7 disposed near the photodiode, and then supplied to the luminance control circuit 12. Therefore, the influence of the noise entering into the wiring lines connected to the luminance control circuit 12 can be minimized and an accurate luminance control can be performed.

Further, in the above structure, the method in which the chip-select signal CS 10 is supplied when the P/S 8 converts the data into serial data and outputs externally is employed. According to this method, for instance, the microwire interface, which has been used already, can be used for controlling the luminance of a mobile phone. As described above, this structure does not require an external separate circuit, and it can achieve the automatic luminance control without causing increases in size of the device and cost.

In the above-described embodiment, the optical sensor 6 is disposed on the top of the display region, as illustrated in FIG. 1, however, note that the present invention is not limited to the above example. In terms of the visibility of the display region, the location of the optical sensor is not restricted as long as it is disposed in a location where it can detect the illuminance around the display region.

Furthermore, in the above described embodiment, the optical sensor 6 is formed as a light-detecting element using a photodiode, and its output current is detected, however, the present invention is not limited to this example, and the similar effects can be achieved by using other devices that change their voltage or current reacting to external light such as phototransistor.

Further, in the above described embodiment, the present invention is applied to a transmission-type LCD having the light source provided in the back as the display device 1, however, the present invention is not limited to this example, and can be applied to a reflection-type LCD that has the light source disposed in the front side of the substrate and displays a picture by reflecting the light source or external light or to a display device that uses a self-luminous element such as organic electro-luminescence element.

Further, in the above embodiment, for a better understanding of the invention, a basic structure, where the optical sensor 6 for detecting the illuminance of external light is provided, is prepared and explained giving an example in which the luminance is adjusted, however, the present invention is not limited to this and it is evident that the similar effects can be achieved with a structure where multiple optical sensors are provided on the TFT substrate and the illuminance is detected from multiple locations, and another structure where the luminance is controlled by detecting the light from the backlight.

Further, in the above embodiment, for a better understanding of the invention, only the case where the luminance changes in two steps is shown, however, the present invention is not limited to this example and it is evident that it can also adjust the luminance in many steps by dividing the signal from the optical sensors into multiple steps to control the luminance.

Figure 3:
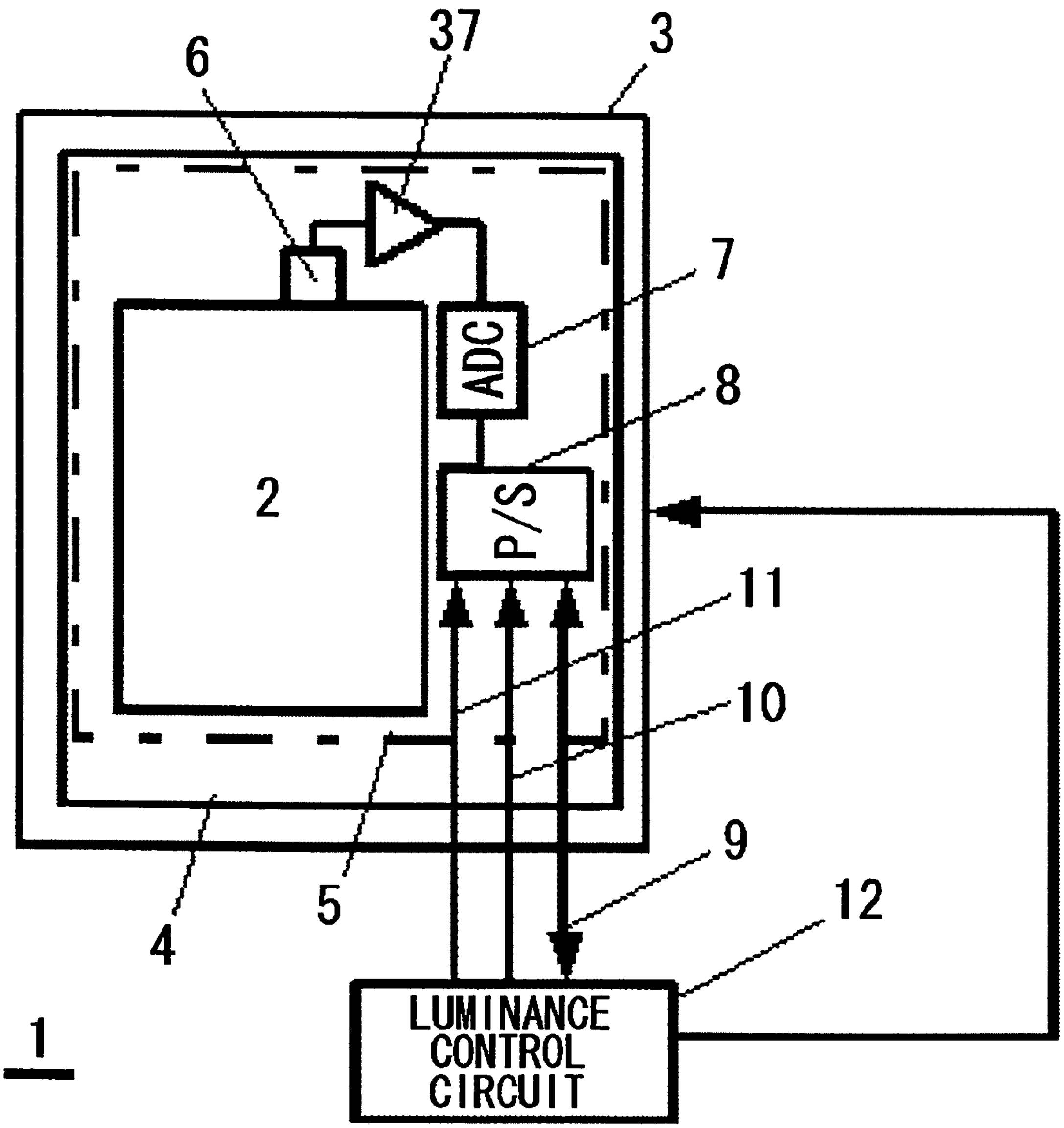
FIG. 3 is an outline drawing of a display device relating to an alternative example of the first embodiment of the present invention.

Further, in the above embodiment, the output from the optical sensor 6 is directly received by the ADC 7, however, the present invention is not limited to this example, and a structure even more resistant to external noise can be achieved by providing an amplifier circuit 37 near the optical sensor 6 as shown in FIG. 3, and having the amplifier circuit 37 receive the signal before transmitting it to the ADC.

Embodiment 2

Figure 4:
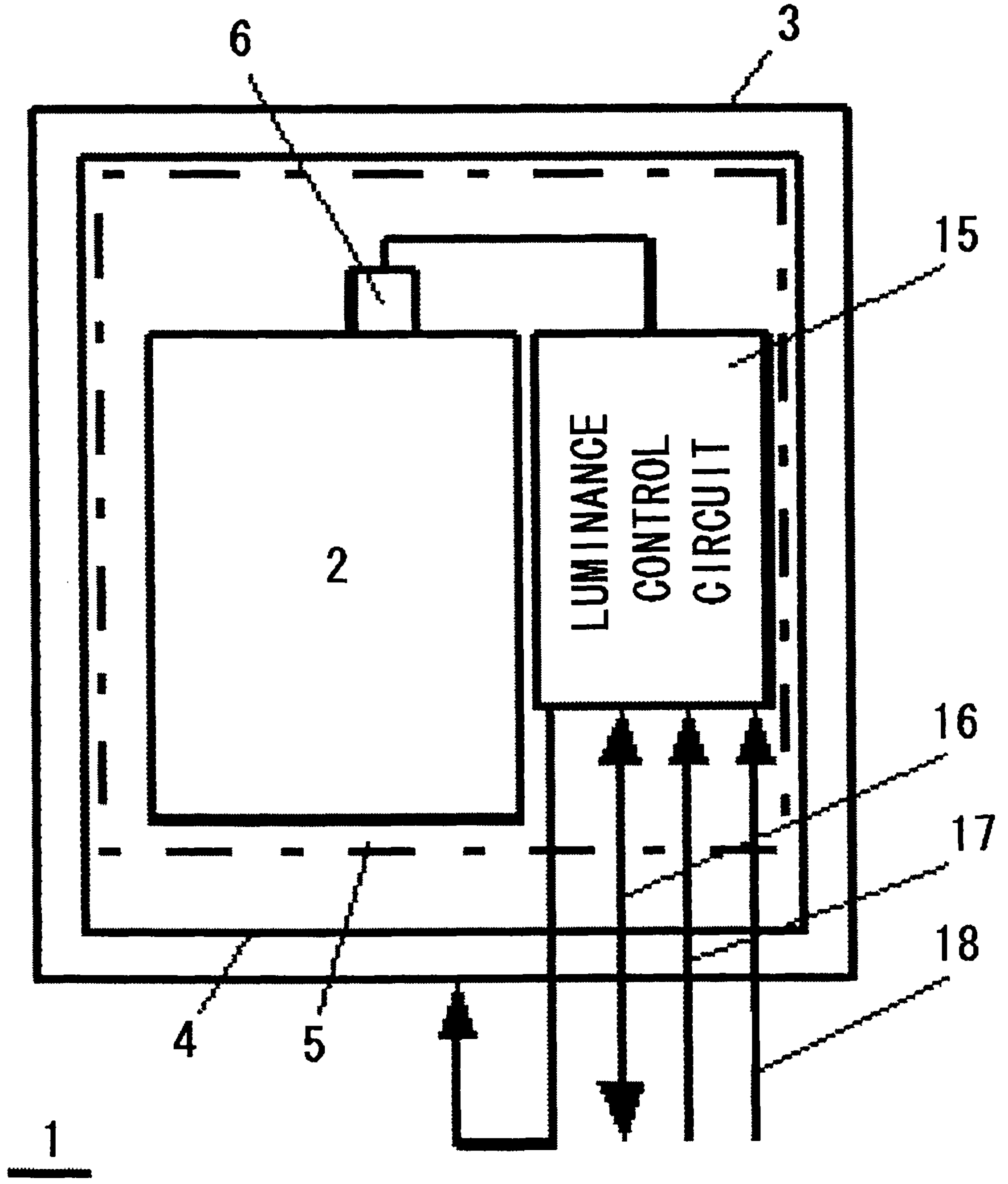
FIG. 4 is an outline drawing of a display device relating to a second embodiment of the present invention.

Next, a second embodiment in which the present invention is applied to a transmission-type LCD, as in the first embodiment, will be described. FIG. 4 is an outline drawing of the display device relating to the second embodiment of the present invention. In reference to FIG. 4, the display device 1 comprises a backlight 3, a TFT substrate 4, on which pixels (electrodes) and a TFT driving liquid crystal are provided, and a counter substrate 5 disposed so that a liquid crystal layer, not shown in the drawing, is interposed between the TFT substrate 4 and the counter substrate 5, and a display region 2 is provided.

On the TFT substrate 4, an optical sensor 6 using a photodiode is formed using the means described in Japanese Patent Kokai Publication No. JP-A-06-11690 or the like. Similarly, a luminance control circuit 15 that controls the luminance of the backlight 3 based on a signal from the optical sensor 6 is formed on the top of the TFT substrate 4. Here, the optical sensor 6 is provided near the display region 2. And the luminance control circuit 15 is constituted to include the TFT formed on the glass substrate that comprises the TFT substrate 4, and is wired and provided near the optical sensor 6.

Toward the luminance control circuit 15, a serial bus 16 that transfers external commands and data for controlling the luminance control circuit 15, a transmission path for a chip-select signal (CS hereinafter) 17 that activates the serial bus 16, and a transmission path for a timing clock (CLK hereinafter) 18 that becomes the reference when the serial bus 16, activated by the CS 17, outputs a signal are provided. Further, the luminance control circuit 15 can control the current flowing in the backlight 3, and it controls the luminance of the backlight 3 based on the output from the optical sensor 6.

An analog signal outputted from the optical sensor 6 is supplied to the luminance control circuit 15 on the TFT substrate 4. The luminance control circuit 15, as in the first embodiment described above, detects the illuminance of external light and performs luminance control of the backlight 3. Since the optical sensor 6 and luminance control circuit 15 are provided near the top of the TFT substrate, the output signal of the optical sensor 6 can minimize the influence from external noise and perform luminance control.

Some mobile phones have a function of decreasing the power consumption of the display device by lowering the luminance of the backlight after a certain period of time has passed. A mobile phone to which the present invention is applied can achieve this function as well. First, the CS 17 is supplied to the luminance control circuit 15 from an external CPU, activating the serial bus 16 connected to the luminance control circuit 15. Next, from the external CPU, command data for lowering the luminance is transmitted to the luminance control circuit 15 via the serial bus 16 in sync with the CLK 18. The luminance control circuit 15, having received the command data, controls so that the current flowing in the LED of the backlight 3 is lowered in order to decrease the power consumption regardless of the brightness of external light.

As described above, according to the structure of the present embodiment, it is possible to decrease the power consumption not only when the illuminance changes by external light, but also when the device is not being used. Needles to say, in the case where the illuminance detection, automatic light control, and the above described off-control of the backlight after a certain period of time has passed are not being performed, the CS 17 is not supplied, deactivating the serial bus 16, and the serial bus 16 is detached from the luminance control circuit 15.

Figure 5:
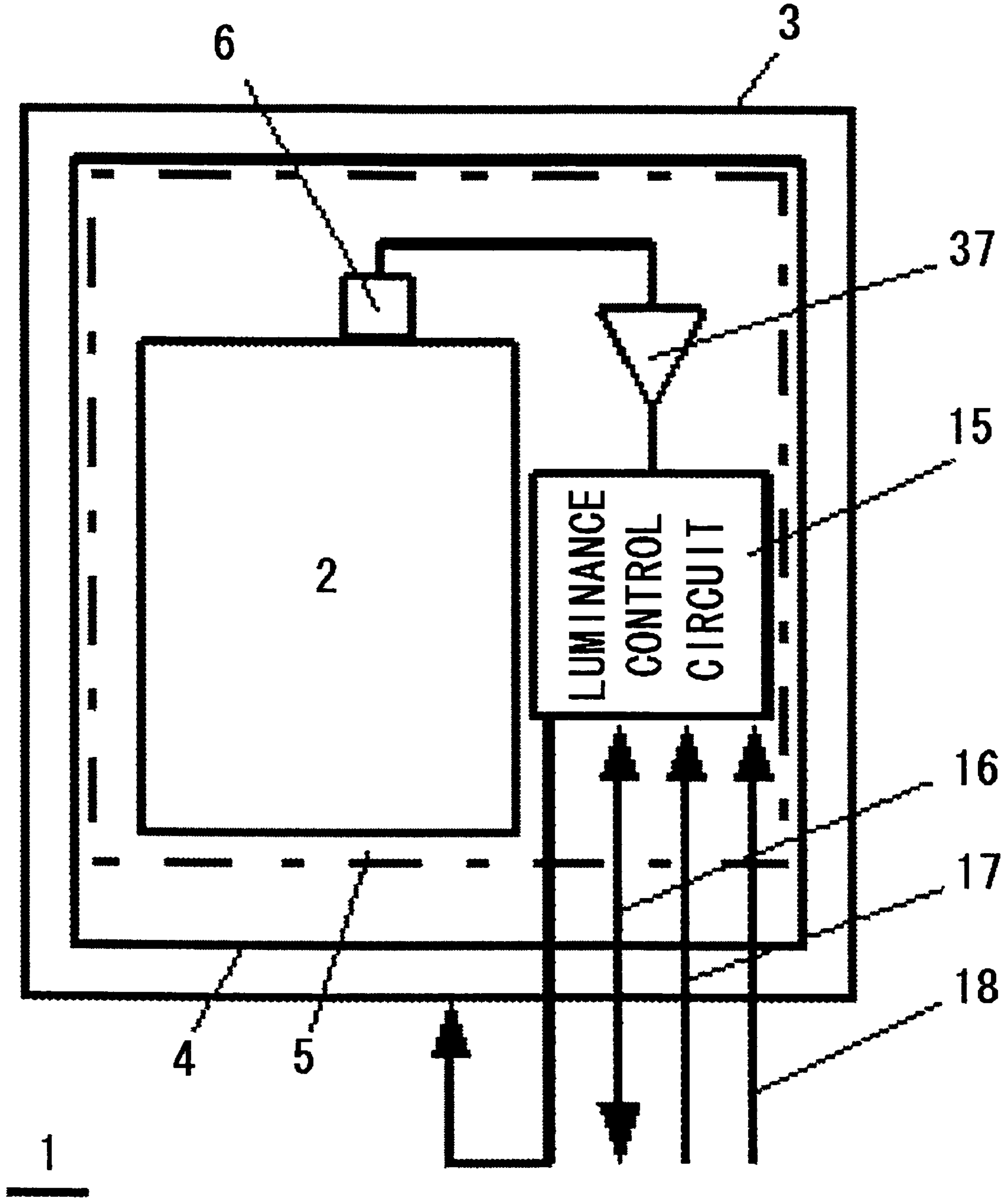
FIG. 5 is an outline drawing of a display device relating to an alternative example of the second embodiment of the present invention.
Figure 6:
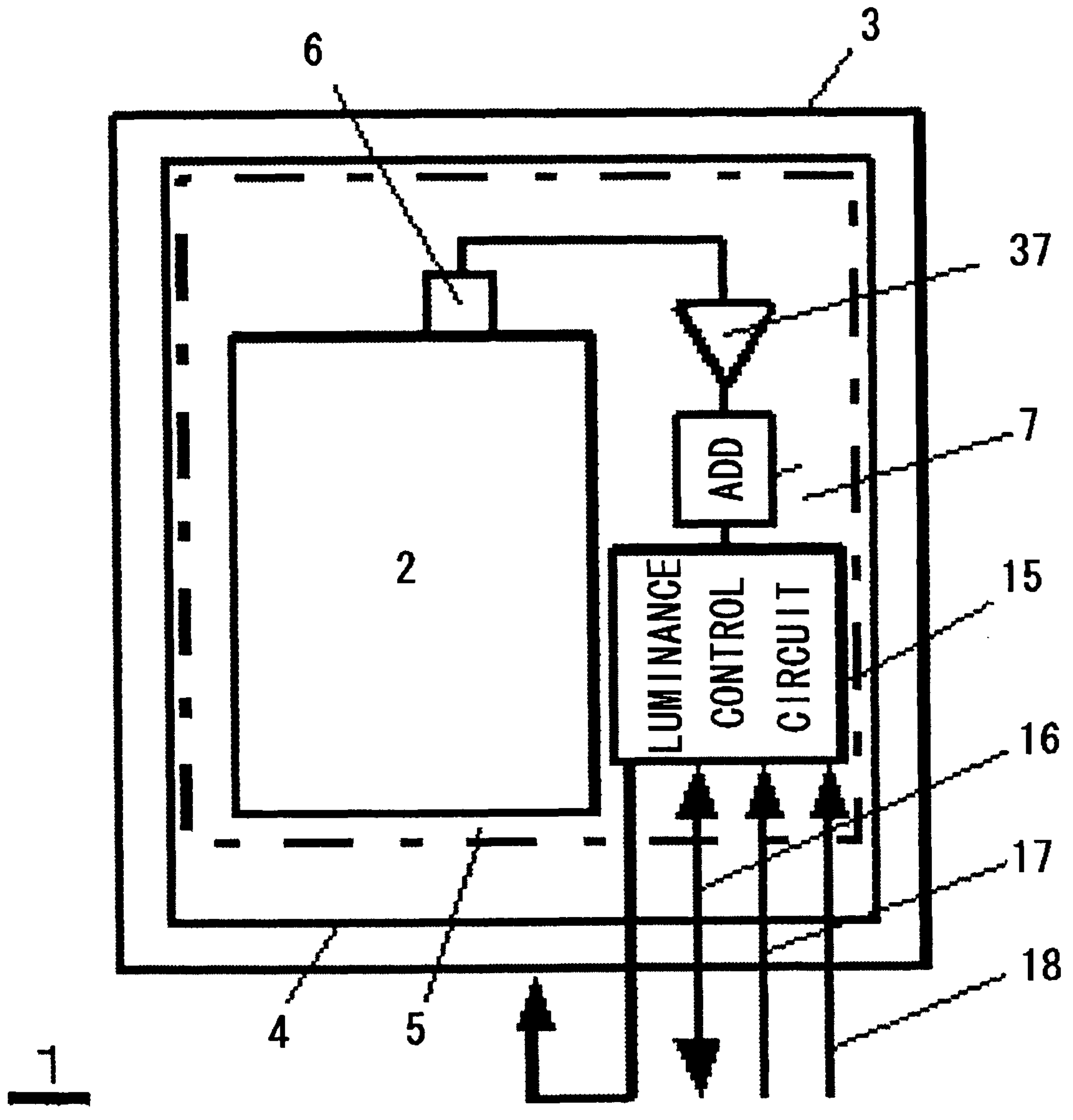
FIG. 6 is an outline drawing of a display device relating to an alternative example of the second embodiment of the present invention.

Further, in the above embodiment, the structure where the optical sensor 6 is directly connected to the luminance control circuit 15 is illustrated and described, however, the present invention is not limited to this example, and an amplifier circuit 37 and an ADC 7 can be provided between the optical sensor 6 and the luminance control circuit 15 as shown in FIGS. 5 and 6, having the amplifier circuit 37 and the ADC 7 receive the signal before transmitting it to the luminance control circuit.

Further, the above embodiment, as in the first embodiment, does not have any restrictions in terms of the location of the optical sensor, the type of the sensor device and the display device, and it can be applied to many display devices that require light control.

Embodiment 3

Figure 7:
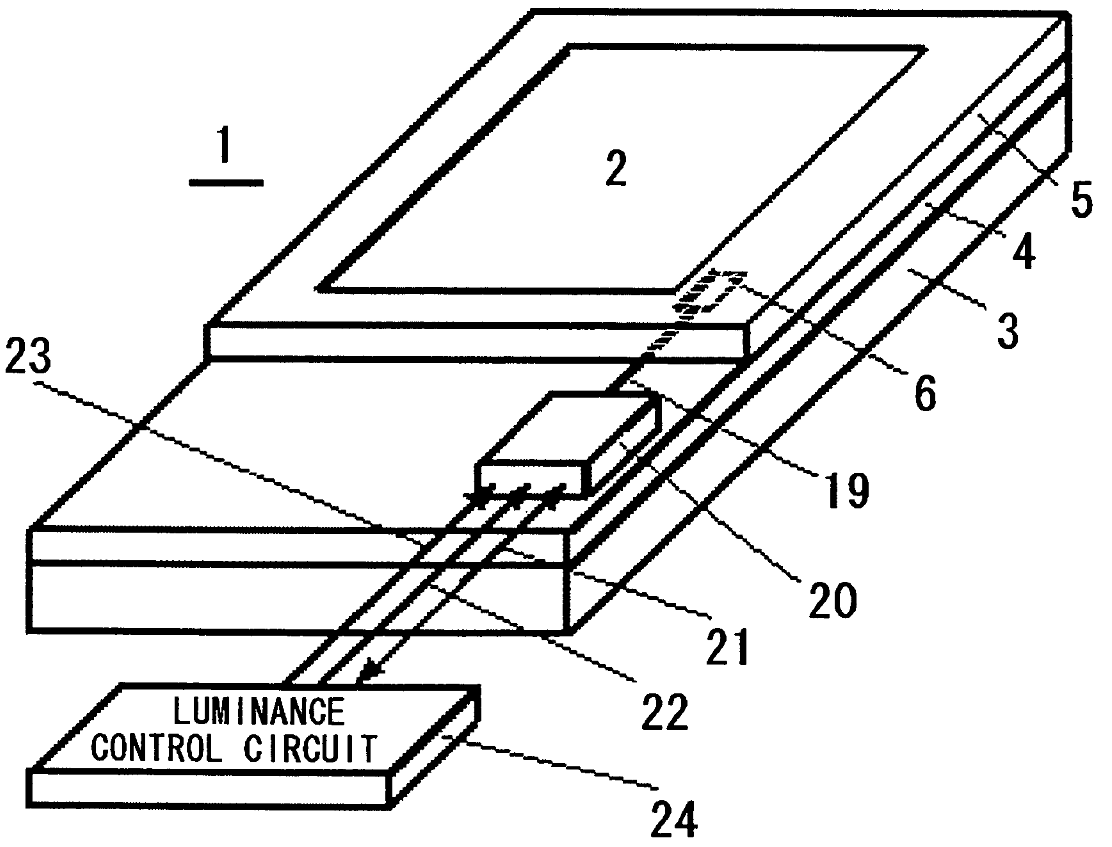
FIG. 7 is an outline drawing of a display device relating to a third embodiment of the present invention.

Next, a third embodiment in which the present invention is applied to a transmission-type LCD, as in the first and second embodiments, will be described. FIG. 7 is an oblique perspective drawing showing the outline structure of the display device relating to the third embodiment of the present invention. In reference to FIG. 7, the display device 1 comprises a backlight 3, a TFT substrate 4, on which pixels (electrodes) and a TFT driving liquid crystal are provided, a counter substrate 5 disposed so that a liquid crystal layer, not shown in the drawing, is interposed between the TFT substrate 4 and the counter substrate 5, and a luminance control circuit 24, and a display region 2 is provided.

On the TFT substrate 4, an optical sensor 6 using a photodiode and a thin film wiring 19 are formed using the means described in Japanese Patent Kokai Publication No. JP-A-06-11690 or the like. Similarly, utilizing the COG (chip-on-glass) process, an IC 20 that includes an ADC and P/S is directly mounted in an area of the TFT substrate that is not covered by the counter substrate 5. Here, the optical sensor 6 is provided near the display region 2.

Between the IC 20 and the luminance control circuit 24, a serial bus 21 for transmitting the signal from the IC 20, a transmission path for a CS 22 that activates the serial bus 21, and a transmission path for a CLK 23 that becomes the reference when the serial bus 21, activated by the CS 22, outputs a signal are provided. Further, the luminance control circuit 24 can control the current flowing in the backlight 3, and it controls the luminance of the backlight 3 based on the serial data from the IC 20.

An analog signal outputted by the optical sensor 6 is supplied to the IC 20 via the wiring 19, and converted into serial digital data by the ADC and P/S. Here, when the CS signal 22 is supplied to the IC 20 from an external CPU, the serial bus 21 becomes active and the IC 20 transmits the data to the luminance control circuit 24 via the serial bus 21 in sync with the CLK 23. The luminance control circuit 24, having received the digital data, can automatically adjust the luminance of the display device by controlling the luminance of the backlight 3 based on the value of the data.

This luminance control can be performed without much influence from external noise since the wiring 19 only connects a short distance within the TFT substrate 4. Further, because the signal communication with the outside of the display device can be performed with a small number of wiring lines, the size of the device can be made smaller.

Further, in the above embodiment, the case where the silicon chip with the ADC and P/S built in is prepared and mounted utilizing the chip-on-glass process has been described, however, the present invention is not limited to this example, and it is evident that the same effects can be achieved by employing a structure where an IC including only parts of the ADC and P/S circuits is used and the rest of the circuits is constituted by the TFT formed on the TFT substrate.

Further, according to the present invention, the luminance control of a display device according to the external light illuminance can be performed by the display device independently without communicating with the outside. It is because a sensor and current control circuit (luminance control circuit 24) for the illumination of the display device are provided on the side of the display device.

Embodiment

Figure 8:
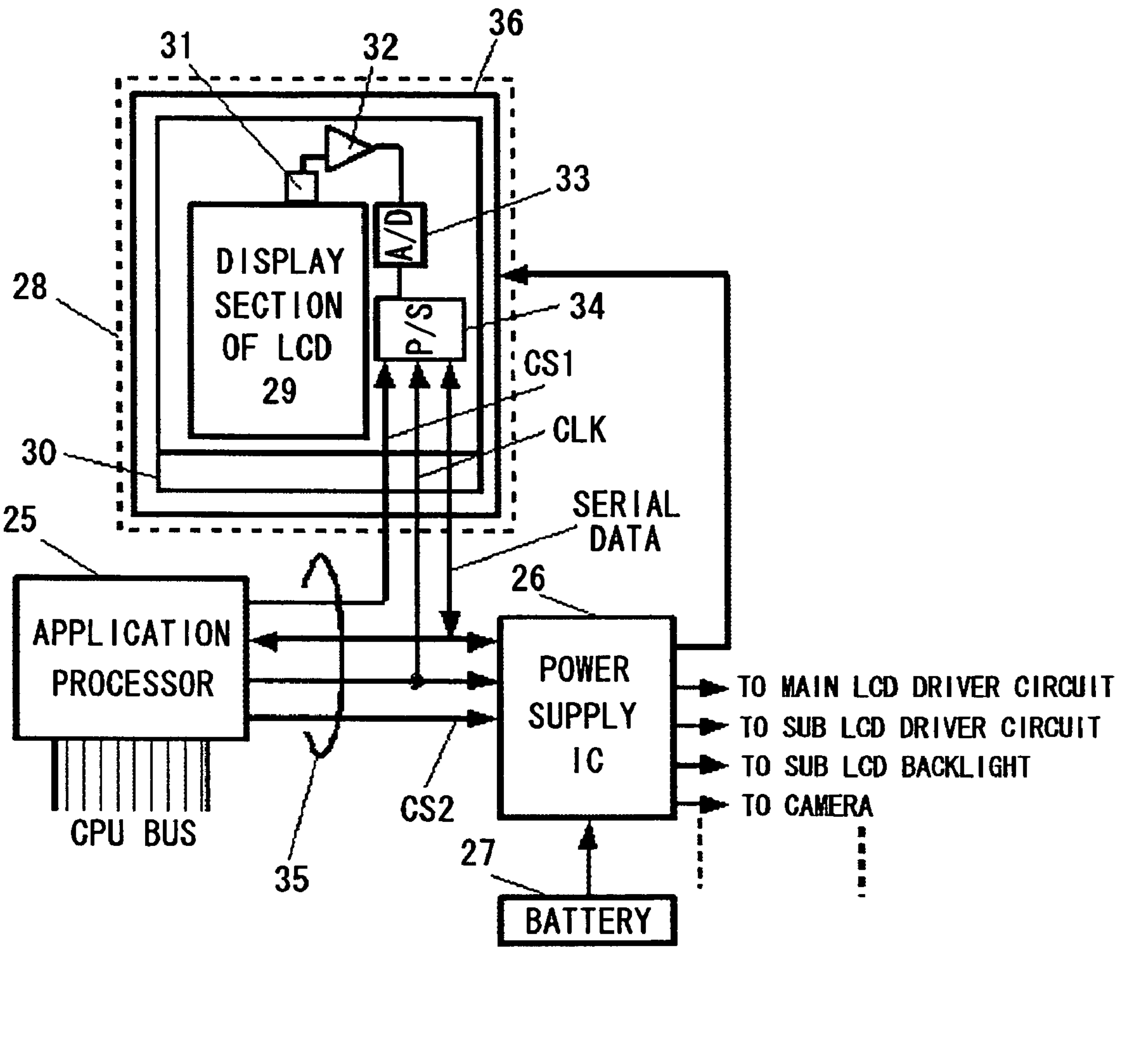
FIG. 8 is a drawing showing the outline structure of the liquid crystal display device of a mobile phone relating to an embodiment of the present invention.
Figure 9:
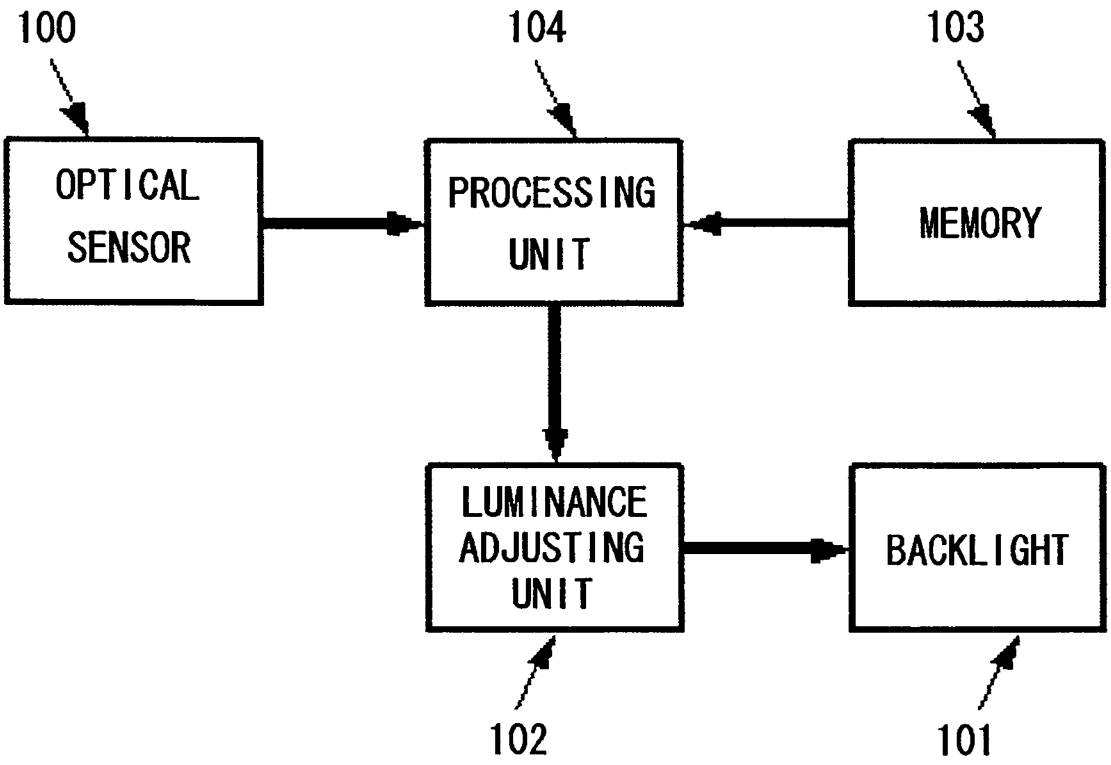
PRIOR ART FIG . 9
FIG. 9 is a block diagram showing the function structure of an LCD described in Patent Document 1.
Figure 10:
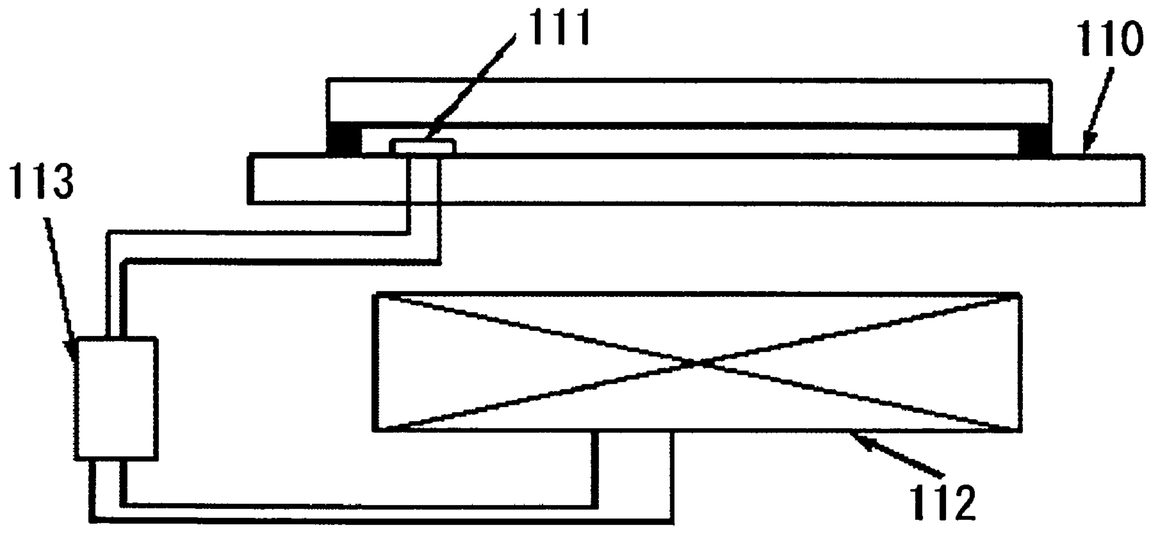
PRIOR ART FIG . 10
FIG. 10 is a drawing showing the structure of an LCD described in Patent Document 4.

Next, in order to describe a detailed structure of the above-mentioned embodiments, an embodiment of the present invention will be explained in detail with reference to the drawing. FIG. 8 is drawing showing a circuit structure relating to the luminance control of the backlight of the LCD of a mobile phone relating to an embodiment of the present invention. In reference to FIG. 8, a main LCD 28, sub-display (not shown in the drawing), camera (not shown in the drawing), an application processor 25 that controls other devices, a power supply IC 26 that supplies the power to each of the function blocks, battery 27 that supplies the power to the power supply IC 26, main LCD 28, the LCD section (display region) 29 of the main LCD 28, a TFT substrate 30 that constitutes the main LCD 28, and backlight 36 for the main LCD are shown.

On the TFT substrate 30, an optical sensor 31 using a photodiode, an amplifier circuit 32, ADC 33, and a P/S 34 are formed using the means described in Japanese Patent Kokai Publication No. JP-A-06-11690 or the like. Here, the optical sensor 31 is provided near the LCD section (display region) 29. And the amplifier circuit 32, ADC 33 and P/S 34 are constituted to include the TFT formed on the glass substrate that comprises the TFT substrate 30, and each of them is wired and provided near the LCD section (display region) 29.

Further, the application processor 25 can read a luminance map that stores the information, expressed as digital data, on the relationship between external light illuminance and the target luminance of the backlight. Also, the application processor 25 is connected by a microwire interface 35 that controls the operation of the power supply IC 26 and P/S. More concretely, the microwire interface 35 comprises four lines: two bus lines for transferring the serial data, a chip-select line that selects a device (a CS 1 selects the P/S 34 and a CS2 selects the power supply IC 26), and a clock that transmits a timing signal for transferring data with the device selected by the chip-select line.

Next, the operation of the present embodiment will be explained. First, the application processor 25 selects the CS 1 activating the output of the P/S 34. Then, the application processor 25 receives the digital data supplied from the P/S 34 via the serial bus line (the double-arrowed line) in sync with the clock signal CLK supplied to the P/S 34.

The data outputted from the P/S 34 at this time is obtained as follows: a current that flows in the optical sensor 31 when it receives external light is converted into a voltage with the amplifier circuit 32, then, analog-to-digital converted by the ADC 33, and parallel-serial converted by the P/S 34.

Next, the application processor 25 refers to the luminance map and calculates the target luminance of the backlight that corresponds to the digital data inputted. Meanwhile, the serial bus line (the double-arrowed line) of the power supply IC 26 is not active since the CS 2 is not selected, and the power supply IC 26 is not influenced by the serial bus line.

If the current luminance of the backlight 36 corresponds to the target luminance of the backlight that corresponds to the digital data, the application processor 25 will not change the luminance of the backlight 36 and it will move to another operation.

On the other hand, as a result of the above comparison, if the current luminance of the backlight 36 is different from the target luminance of the backlight that corresponds to the digital data, the application processor will move to the following operation.

First, the application processor 25 selects the CS 2 of the microwire interface 35 and activates the serial bus line of the power supply IC 26. Then, the application processor 25 transmits a command for setting the backlight 36 to the luminance that corresponds to the map to the power supply IC 26 via the serial bus line in sync with the clock signal CLK.

The power supply IC 26, having received the above-mentioned command, stores the data that corresponds to this backlight luminance, and changes the current value supplied to the backlight 36 based on this data. At this time, the serial bus line (the double-arrowed line) is inactive since the CS 1 is not selected, and the P/S 34 is not influenced by the serial bus line.

As described above, in various types of electronic devices comprising LCDs and ELDs such as a mobile phone, it becomes possible to properly control the luminance according to external light illuminance by forming an optical sensor and the other circuits mentioned above on a substrate on which the switching element of the display device is formed. Since the structures of the above described embodiments employ the microwire interface used in mobile phones, they can be suitably used for the display device of a mobile terminal device demanded to be small, light and reliable, not to mention that it is resistant to noise.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A display device comprising:

a light-detecting element, and a data transmission circuit that converts a signal outputted from said light-detecting element into serial digital data and outputs the result, said light-detecting element and said data transmission circuit being provided on a substrate on which a pixel switching element is disposed, said light-detecting element and said data transmission circuit being disposed substantially adjacent to a display region and connected together by wiring, wherein luminance is adjusted based on said serial digital data.

2. A display device comprising:

a light detecting element disposed on a substrate;

a data transmission circuit, disposed on the substrate, that converts a signal outputted from said light detecting element into serial digital data and outputs the result; and a luminance control circuit that drives a light source disposed in the front or back of said substrate and adjusts the luminance based on a signal outputted from said data transmission circuit;

said light-detecting element and said luminance control circuit being disposed substantially adjacent to a display region and connected together by wiring, wherein said luminance control circuit is provided on a substrate on which a pixel switching element is disposed.

3. The display device as defined in claim 1, wherein said data transmission circuit comprises an analog-to-digital converter circuit that converts a signal outputted from said light-detecting element into a digital signal and a parallel-serial converter circuit that converts the output of said analog-to-digital converter circuit into serial digital data and outputs the result.

4. The display device as defined in claim 2, wherein said data transmission circuit comprises an analog-to-digital converter circuit that converts a signal outputted from said light-detecting element into a digital signal and a parallel-serial converter circuit that converts the output of said analog-to-digital converter circuit into serial digital data and outputs the result.

5. A display device comprising:

a light-detecting element; and a luminance control circuit that drives a light source disposed in the front or back of a substrate and adjusts a luminance of the light source based on a signal outputted from said light-detecting element, said light-detecting element and said luminance control circuit being disposed substantially adjacent to a display region and connected by wiring lines;

wherein said light-detecting element and said luminance control circuit are provided on said substrate on which a pixel switching element is disposed.

6. The display device as defined in claim 1, wherein an amplifier circuit that amplifies a signal outputted from said light-detecting element is provided on said substrate.

7. The display device as defined in claim 2, wherein an amplifier circuit that amplifies a signal outputted from said light-detecting element is provided on said substrate.

8. The display device as defined in claim 5, wherein an amplifier circuit that amplifies a signal outputted from said light-detecting element is provided on said substrate.

9. The display device as defined in claim 1, wherein at least said data transmission circuit is comprised of an IC (Integrated Circuit) mounted on said substrate having a structure prepared by the chip-on-glass process.

10. The display device as defined in claim 2, wherein at least said data transmission circuit is comprised of an IC (Integrated Circuit) mounted on said substrate having structure prepared by the chip-on-glass process.

11. The display device as defined in claim 1, wherein at least said data transmission circuit is comprised of a thin-film transistor formed on said substrate.

12. The display device as defined in claim 2, wherein at least said data transmission circuit is comprised of a thin-film transistor formed on said substrate.

13. The display device as defined in claim 1, wherein an amplifier circuit that amplifies a signal outputted from said light-detecting element is provided on said substrate and said amplifier circuit is comprised of an IC (Integrated Circuit) mounted on said substrate.

14. The display device as defined in claim 1, wherein an amplifier circuit that amplifies a signal outputted from said light-detecting element is provided on said substrate and said amplifier circuit is comprised of a thin-film transistor formed on said substrate.

15. The display device as defined in claim 8, wherein said luminance control circuit is comprised of an IC (Integrated Circuit) mounted on said substrate.

16. The display device as defined in claim 2, wherein said luminance control circuit is comprised of a thin-film transistor formed on said substrate.

17. A transmission-type display device comprising the display device as defined in claim 1, wherein a light source is disposed in the back of said substrate.

18. A reflection-type display device comprising the display device as defined in claim 1, wherein a light source is disposed closer to the front side of said reflection-type display device at least than said substrate.

19. The display device as defined in claim 1, wherein a light emitting element is disposed on the front side of said substrate.

20. An electronic device comprising the display device as defined in claim 1.

* * * * *